No. 731,153. Patented June 16, 1903.

UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 731,153, dated June 16, 1903.

Application filed August 25, 1902. Serial No. 120,999. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in compositions of matter to be used for pigments and in the process of making same; and it consists, respectively, in the novel product and in the new steps more fully set forth in the specification and pointed out in the claims.

The composition consists of an intimate mixture of the precipitates of basic zinc carbonate, barium sulfate, and barium carbonate in proportions determined by the molecular weights of the soluble salts from which the precipitates are derived. The composition may be extended to include zinc sulfid as an additional ingredient.

In the preparation of my composition I employ mixtures of solutions of zinc sulfate, carbonate of an alkali metal, and a salt of barium, first mixing the zinc salt with the alkali carbonate, whereupon there is precipitated the basic zinc carbonate, leaving the sulfate of the alkali metal in solution. To the latter is added an additional quantity of the alkali carbonate, and then a solution of the barium salt is added in sufficient quantity to react with the alkali-metal sulfate and carbonate, whereby barium sulfate and barium carbonate will be precipitated, leaving in solution a final salt whose acid depends on the character of barium salt used as the reagent. The alkali-metal carbonates used may be either those of sodium, potassium, or ammonium. The barium salts used may be any of the water-soluble salts, such as the sulfid, chlorid, acetate, nitrate, hydrate, and the like.

As an illustration of the general principle here enunciated I prepare five molecular equivalents of an aqueous solution of zinc sulfate, to which I add five equivalents of sodium carbonate, when there is precipitated one equivalent of basic zinc carbonate, leaving a solution of five equivalents of sodium sulfate. To the latter is added five equivalents of sodium carbonate and ten equivalents of barium sulfate, when there results a precipitate of five equivalents of barium sulfate, five of barium carbonate, and a solution of ten equivalents of sodium sulfid, thus:

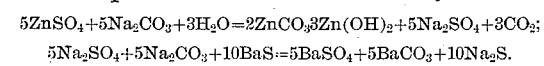

$5Na_2SO_4 + 5Na_2CO_3 + 10BaS = 5BaSO_4 + 5BaCO_3 + 10Na_2S.$

The precipitates are separated from the final solution, washed and thoroughly mixed, the surplus water separated in any suitable manner, such as filtering or filter-pressing, then dried, and, if desired, the basic zinc carbonate constituent converted into zinc oxid by any suitable method, such as calcination. The sodium-sulfid solution can be evaporated and sodium-sulfid crystals recovered.

The manner of bringing the solutions together can be varied without departing from the principle of my process—for example, the ten equivalents of sodium carbonate can be added at one time, as per the following reactions:

$5ZnSO_4 + 10Na_2CO_3 + 3H_2O =$
$\qquad 2ZnCO_3 \cdot 3Zn(OH)_2 + 5Na_2CO_3 + 5Na_2SO_4 + 3CO_2;$ $5Na_2CO_3 + 5Na_2SO_4 + 10BaS = 5BaSO_4 + 5BaCO_3 + 10Na_2S.$ While the sulfid of barium is used as the reagent on account of its cheapness, other soluble salts of the same base can of course be substituted. Thus with barium chlorid we would have the following reaction:

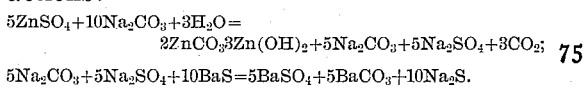

or if we use barium nitrate we have the following reaction:

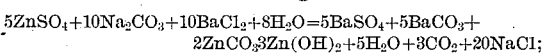

Again, if we use barium acetate the following reaction would result:

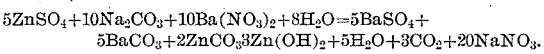

From the foregoing it will be observed that any salts of barium except the sulfid can be added simultaneously with the other reagents, thus precipitating the several compounds at one time, while with barium sulfid the latter cannot be added until after the precipitation of the zinc as carbonate on account of the danger of the zinc precipitating as the sulfid, owing to the affinity between zinc and sulfur.

Where it is desirable to extend the foregoing process to include as an additional constituent the sulfid of zinc, I may add to the first two reactions ten equivalents of zinc sulfid, thereby precipitating ten equivalents of zinc sulfid, and leaving ten equivalents of a solution of alkali sulfate, thus:

$$10Na_2S + 10ZnSO_4 = 10ZnS + 10Na_2SO_4.$$

In that event the final composition would be a mixture of the precipitates of basic zinc carbonate, barium sulfate, barium carbonate, and zinc sulfid. In lieu of zinc sulfate I may add to the sodium sulfid any other salt of zinc—such as the acetate, chlorid, nitrate, &c.—leaving a sodium salt in solution, the acid of which will correspond with the acid of the zinc salt used.

The determination of the actual quantities of the materials used in the foregoing reactions is a simple stoichiometric problem based upon the atomic weights of the elements constituting any molecule, and as a commercial illustration of the formula contained in the second of the above reactions (or that in which ten equivalents of sodium carbonate are added initially) the following may be cited: I prepare separate aqueous solutions of the following in the proportions specified, thus, anhydrous zinc sulfate, eight hundred and five (805) pounds, anhydrous sodium carbonate ten hundred and sixty (1,060) pounds, and barium sulfid sixteen hundred and ninety (1,690) pounds. The zinc-sulfate solution and sodium-carbonate solution are brought together, one-half of the sodium carbonate reacting with the zinc sulfate, when five hundred and forty-seven (547) pounds of basic zinc carbonate are precipitated and seven hundred and ten (710) pounds of sodium sulfate are formed in solution. The barium sulfid is now added, which, reacting with the sodium sulfate and the remaining half of the sodium carbonate, will form eleven hundred and sixty-five (1,165) pounds of barium sulfate and nine hundred and eighty-five (985) pounds of barium carbonate, leaving in solution seven hundred and eighty (780) pounds of sodium sulfid, which when evaporated, crystallizing with nine molecules of water, forms two thousand four hundred (2,400) pounds of sodium-sulfid crystals. The total weight of the combined precipitates is two thousand six hundred and ninety-seven (2,697) pounds.

It is of course to be understood that I may invoke the doctrine of chemical equivalents wherever the same is applicable.

The term "zinc carbonate" as used in the claims is employed in its broad and generic sense and is intended to cover not only the normal salt, but the basic precipitate as well.

Having described my invention, what I claim is—

1. The process of making pigment which consists in mixing solutions of zinc sulfate, and a carbonate of an alkali metal, and a salt of barium thereby forming precipitates of barium sulfate, barium carbonate, and basic zinc carbonate, substantially as set forth.

2. The process of making pigment which consists in mixing solutions of suitable equivalents of zinc sulfate, carbonate of sodium and a salt of barium, and recovering the resulting precipitates, substantially as set forth.

3. The process of making pigment which consists in mixing solutions of suitable equivalents of zinc sulfate, a carbonate of an alkali metal, and barium sulfid, and recovering and mixing the resulting precipitates, substantially as set forth.

4. The process of making pigment which consists in mixing solutions of zinc sulfate, the carbonate of an alkali metal and a salt of barium thereby precipitating zinc carbonate, barium sulfate, and barium carbonate, then adding zinc sulfate to produce a final and additional precipitate of zinc sulfid, substantially as set forth.

5. A pigment comprising a mixture of zinc carbonate, barium sulfate, and barium carbonate, substantially as set forth.

6. A pigment comprising a mixture of precipitated zinc carbonate, barium sulfate, and barium carbonate, substantially as set forth.

7. A pigment comprising a mixture of precipitated zinc carbonate, barium sulfate, barium carbonate, and zinc sulfid, substantially as set forth.

8. A pigment comprising a mixture of zinc carbonate, barium sulfate, barium carbonate, and zinc sulfid, substantially as set forth.

In testimony whereof I affix my signature in presence of two witnesses.

WILLIAM J. ARMBRUSTER.

Witnesses:
　EMIL STAREK,
　G. L. BELFRY.